May 13, 1941.  C. C. LEADER  2,242,009

DYNAMOELECTRIC MACHINE

Filed Dec. 29, 1939

Inventor:
Charles C. Leader,
by Harry E. Dunham
His Attorney.

Patented May 13, 1941

2,242,009

UNITED STATES PATENT OFFICE 2,242,009

DYNAMOELECTRIC MACHINE

Charles C. Leader, Schenectady, N. Y., assignor to General Electric Company, a corporation of New York Application December 29, 1939, Serial No. 311,533

4 Claims. (Cl. 172—120)

My invention relates to improvements in dynamoelectric machines, and particularly to the type machine provided with a multiple resistance conductor section winding in one of the elements.

An object of my invention is to provide a dynamoelectric machine having an improved multiple resistance conductor section winding.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
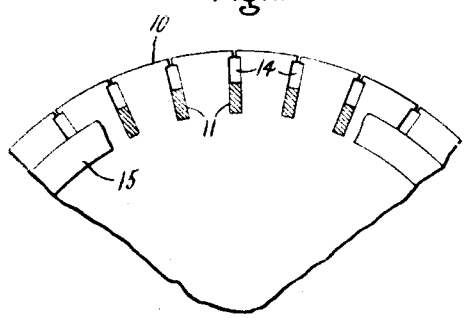
Figure 2:
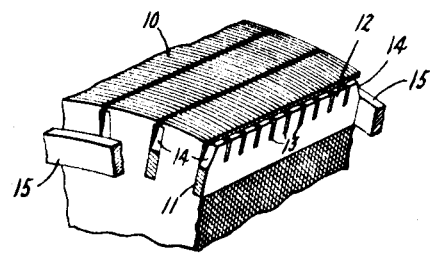
Figure 3:
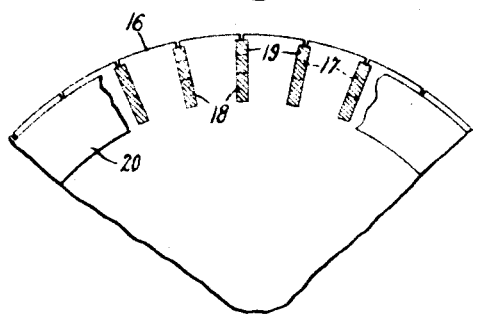

In the drawing, Fig. 1 is an end view of a part of a dynamoelectric machine rotatable member embodying my invention, partly broken away to illustrate the relative arrangement of the winding elements; Fig. 2 is a perspective view of a part of the rotatable member illustrated in Fig. 1; Fig. 3 is an end view of a part of a rotatable member of a dynamo-electric machine, partly broken away to illustrate a modification of my invention; and Fig. 4 is a perspective view of a part of the arrangement shown in Fig. 3.

Referring to the drawing, I have shown in Figs. 1 and 2 the rotatable member of a dynamoelectric machine provided with a core formed of a plurality of laminations 10 of magnetic material having a plurality of winding slots formed therein adjacent the outer peripheral edge. These winding slots are of the deep slot type and are of substantially uniform width throughout. Multiple resistance section conductor squirrel cage windings have been made in the past of separate conductors and of cast connected conductors. Windings of this type made of separate conductors can be provided with conductors having any desired electrical resistance in different sections of each slot of the winding in order to provide the desired starting and running characteristics to the machine. In this arrangement, I utilize conductors wherein the resistance of different sections of the conductor in each slot is varied by interrupting the longitudinal continuity of one of the sections of the conductor. Bar conductors are arranged in the slots having a depth substantially equal to the depth of the slots, and the lower sections 11 of these conductors extend substantially continuously longitudinally through the core. The outer sections 12 of each of these bar conductors is provided with a plurality of slots or grooves 13 extending from the outer edge transversely across the conductor. The outer ends of these bar conductors also are cut away adjacent the upper outer corners as shown at 14 to a depth substantially equal to the depth of the grooves 13. This provides an electrically conductive section of relatively lower resistance adjacent the inner portion of the slots than adjacent the outer portion of the slots. The squirrel cage winding is completed by end rings 15 arranged at each end of the machine and electrically connected to all of the conductors in the slots so as to short circuit these conductors to provide a squirrel cage rotor winding. The starting and running characteristics of this construction are substantially the same as those of a true multiple squirrel cage winding and the arrangement provides a desirable high starting torque obtainable with this type winding, and also provides a higher maximum torque and lower full load slip than a comparable true double squirrel cage winding, these latter being comparable to that obtainable in a single resistance section conductor machine. Furthermore, the resistance of the outer high resistance slot section may be varied as desired by varying the number of grooves 13 to vary the interruptions in the longitudinal continuity of the outer conductor section. The desirable characteristics obtainable by these arrangements may be explained by the fact that during starting of such a machine, the current in the motor is substantially at line frequency, and substantially no current flows through the interrupted outer conductor section. Under running conditions, in the range from maximum torque to substantially synchronous speed, the frequency of the rotor currents is relatively low and the current is distributed substantially uniformly throughout the entire section of conductor in the winding slots, resulting in improved torque and slip characteristics.

Figure 4:
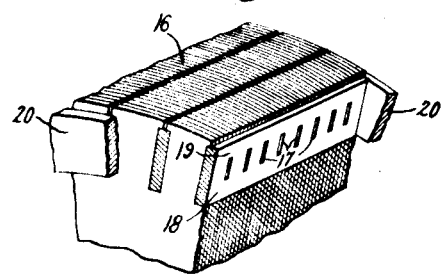

Another embodiment of my improved dynamoelectric machine rotatable member using this type of winding may be made of bars, as shown in Figs. 3 and 4. In this arrangement, I utilize conductors which are adapted to provide substantially three different resistance sections in each slot. To provide these three different sections, I arrange a plurality of electrically conductive bars in slots formed in a laminated core 16 of magnetic material. Each bar comprises a conductor of substantially uniform material, and the different resistance in the different sections is obtained by forming a plurality of transversely extending and longitudinally spaced apart slots or grooves 17 through a section of the bars radially intermediate the inner and outer sections thereof to provide an inner conductor section 18 of substantially larger cross-sectional area than an outer conductor section 19. With such an arrangement, the longitudinal continuity of the intermediate section of the conductor is interrupted and is of higher resistance than the inner conductor section 18 and the outer conductor section 19, and the larger inner conductor section 18 is of relatively lower resistance than the outer smaller conductor section 19. The squirrel cage winding is completed by end rings 20 arranged at each end of the rotatable member and electrically connected to each of the conductor bars of the winding. The operating characteristics of this construction are similar to those of the machine element shown in Figs. 1 and 2, and the starting characteristics of this winding may be varied as desired by varying the number of slots or grooves 17, which are formed in the intermediate section of the conductor bars, and also by varying the relative position and size of these slots with respect to the inner and outer sections of the bars, so as to vary the relative size and resistance of these inner and outer sections.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A member for a dynamoelectric machine including an element of magnetic material having winding slots formed therein, a winding in said slots including conductor sections extending substantially continuously longitudinally of said element through said slots and interruptions in the longitudinal continuity of a section of said conductors intermediate the radially inner and outer sections thereof, and means for connecting together said conductors to complete said winding.

2. A member for a dynamoelectric machine including an element of magnetic material having winding slots formed therein, a winding in said slots including conductor sections extending substantially continuously longitudinally of said element adjacent the radially inner and outer portions of said slots and interruptions in the longitudinal continuity of an intermediate radial section of said conductors, and means for connecting together said conductors to complete said winding.

3. A member for a dynamoelectric machine including an element of magnetic material having winding slots formed therein, a winding in said slots including conductor sections extending substantially continuously longitudinally of said element through said slots and interruptions in the longitudinal continuity of a section of said conductors, said interrupted section being arranged radially between longitudinally continuous sections and arranged to provide an outer relatively high resistance small section and an inner relatively low resistance large section with an intermediate section of substantially higher resistance than said inner and outer sections, and means for connecting together said conductors to complete said winding.

4. A member for a dynamoelectric machine including an element of magnetic material having winding slots formed therein, a winding in said slots including conductor sections extending substantially continuously longitudinally of said element adjacent the radially inner and outer portions of said slots and interruptions in the longitudinal continuity of a intermediate radial section of said conductors arranged to provide a relatively high resistance outer section and a relatively low resistance inner section, said interrupted intermediate section being of substantially higher resistance than said inner and outer sections, and means for connecting together said conductors to complete said winding.

CHARLES C. LEADER.